Patented Dec. 28, 1948

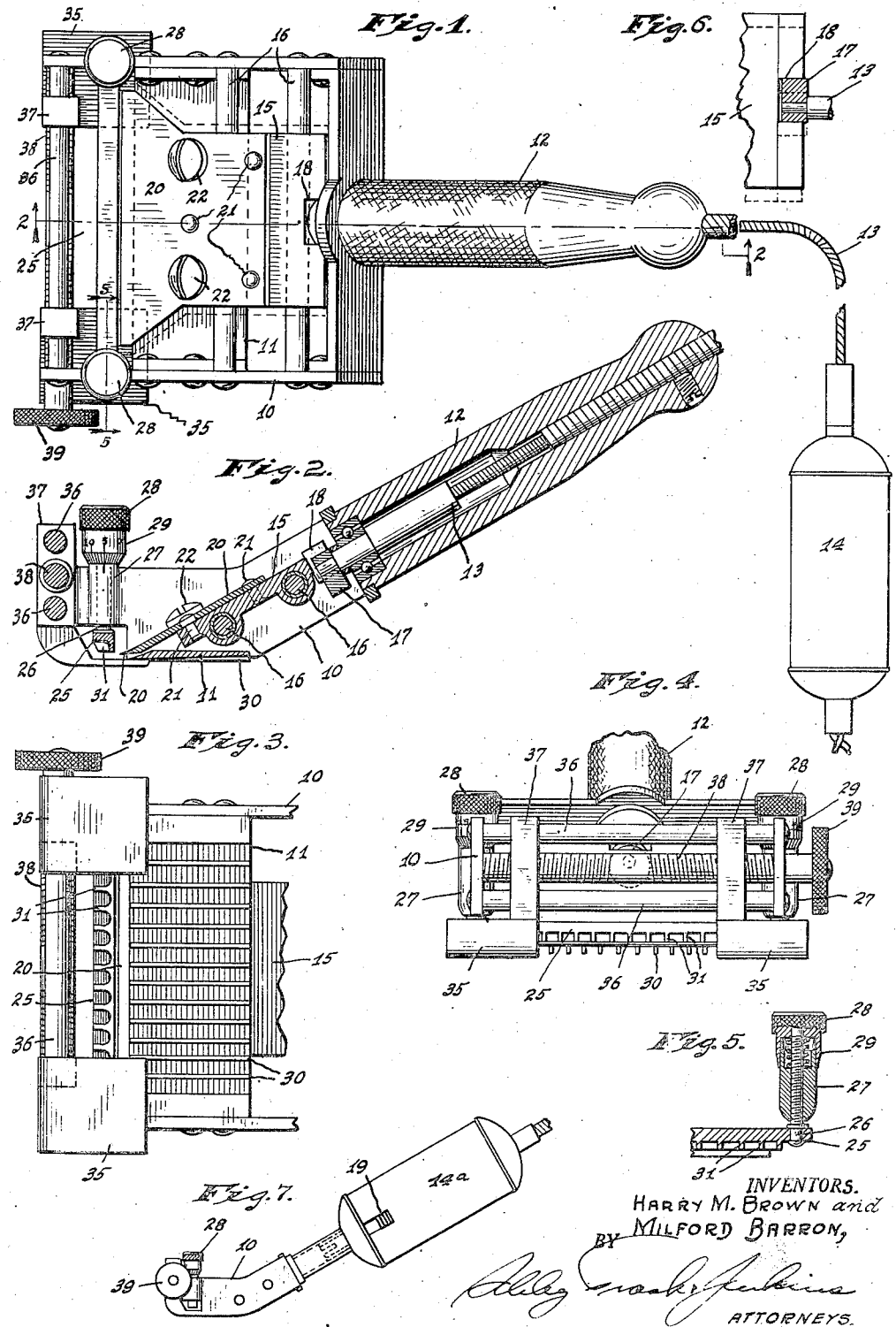

2,457,772

UNITED STATES PATENT OFFICE 2,457,772

SURGICAL INSTRUMENT FOR SKIN GRAFTING

Harry M. Brown, Indianapolis, and Milford Barron, Anderson, Ind.; Irene Brown administratrix of said Harry M. Brown, deceased, assignors to Irene Phillips Brown, Indianapolis, Ind.

Application August 25, 1947, Serial No. 770,360

13 Claims. (Cl. 128—305.5)

Our invention relates to machines for removing sections of skin for use in skin grafts. It is the object of our invention to provide such a machine which can be operated easily and effectively to remove skin-portions of accurately predetermined width and thickness and of any desired length; and to do so with a minimum of effort and of danger.

In carrying out our invention, we provide a hand-held main frame in which there is a rotatable shaft which oscillates a knife blade parallel to the blade edge; and behind that oscillating blade we provide a foot-plate which bears upon the skin, while in front of the blade we provide a micro-adjustable pressure plate of special shape to smooth out the skin just in advance of the blade; and we provide micro-adjusting screws for adjusting separately the two ends of that pressure plate with relation to the plane of the foot-plate; and we provide a pair of guide plates which underlie the ends of the blade and pressure-plate and foot-plate and are adjustable toward and from each other to vary the width of the skin-portion being removed.

The accompanying drawing illustrates our invention: Fig. 1 is a plan of a dermatome embodying our invention in its preferred form; Fig. 2 is a section on the line 2—2 of Fig. 1; Fig. 3 is a bottom view of the front end of the dermatome of Figs. 1 and 2; Fig. 4 is a front elevation of said dermatome; Fig. 5 is a fragmental transverse section on the line 5—5 of Fig. 1, to show the micro-adjustment of the pressure-plate; Fig. 6 is a fragmental detail showing the eccentric-end-slot drive for the carriage; and Fig. 7 is a side elevation on a reduced scale of a modification in which the carriage is driven by a motor mounted in the handle.

A main frame 10 has a foot-plate 11 connecting its two side members and arranged to bear upon the skin to be removed, and an operating handle 12 extending obliquely upward and to the rear for convenient grasping by the surgeon. Extending longitudinally through the handle 12 is a flexible drive shaft 13, which extends out of the rear end of the handle 12 to a suitable driving motor 14, conveniently an electric motor. A transversely movable carriage 15 is mounted in the frame 10 on two cross bars 16, and has an oscillating driving connection to the flexible shaft 13; which flexible driving connection may be a disk 17 eccentrically mounted on the forward end of the shaft 13 and loosely fitting in a transverse slot 18 in the rear edge of the carriage 15; so that as the shaft 13 rotates it moves the carriage 15 back and forth on the cross bars 16. Instead of having a flexible shaft 13 driven by a separate motor 14, we may if desired mount an electric motor 14a directly on the frame 10 so that its casing serves as the handle, with such motor 14a suitably controlled by a switch 19.

Removably mounted on the transversely oscillating carriage 15 is a blade 20, positioned in place by pins 21 extending upward from the carriage 15 through holes in the blade 20 and held in place on the carriage by screws 22. The blade 20 is thus accurately and firmly held in place on the carriage 15, and oscillates with it. The front edge of the blade 20 lies just ahead of and slightly above the front edge of the foot-plate 11; but desirably does not quite touch such foot-plate, as is clear from Fig. 2.

Just in front of the blade 20 is a pressure-plate 25. Rotatably movable but axially fixed in each end of this pressure-plate 25 is a screw 26, which is screw-threadedly received in a boss 27 of the frame 10 and which projects upwardly through and beyond said boss where it is provided with a knurled head 28. The head 28 has a skirt which extends downward and surrounds the upper end of the boss 27. To aid in accurately positioning the associated end of the pressure-plate 25, the skirt of the head 28 is desirably provided with micrometer markings to cooperate with an index on the boss 27. By adjusting the two screws 26, the two ends of the pressure-plate 25 may be separately adjusted normally to the plane of the foot-plate 16 and to the cutting plane of the knife 20. Preferably, the upper end of each screw 26 is surrounded by a compression spring 29 acting between the head 28 and the associated boss 27 to take up lost-motion and contribute to accurate positioning of the pressure-plate 25.

The under face of the foot-plate 11 is provided with ribs 30 extending across said foot-plate in the direction of travel, or perpendicular to the cutting edge of the blade 20. These ribs 30 press down the skin on which they rest, but the spaces between the ribs permit the skin to bulge upward between the ribs 30. The spaces between the ribs extend from the rear edge of the foot-plate 11 to or substantially to the front edge of the foot-plate, with gradually diminishing height as they approach the front edge of the plate.

The under face of the pressure-plate 25 is continuous at its rear edge, next the cutting edge; but in advance of that continuous rear edge is provided with ribs 31 with open spaces between them; so that in operation the skin may rise in the open spaces between the ribs 31 as the dermatome moves forward, but is smoothed out into a plane at the rear edge of such pressure-plate so that it will be flat just in advance of the knife 20, thus the unridged rear edge of the pressure-plate 25 and the front edge of the foot-plate 11 cooperate to hold in a plane the skin lying between those two plates, in the region where the cutting blade 20 cuts.

Two guide plates 35, one at either side of the machine, underlie the ends of the blade 20, the foot-plate 11, and the pressure-plate 25, and are movably mounted on a second pair of cross bars 36 of the frame 10. These cross bars are substantially at the very front of the frame 10, and one above the other; and the guide plates 35 have upward extensions 37 by which they are mounted on those cross bars 36. Lying between the two cross bars 36 is a right-hand-left-hand screw 38 which cooperates with the two guide plate extensions 37, so that as the screw 36 is turned by its knurled head 39 the two guide plates are moved toward or from each other and toward or from the mid-line of the dermatome. This gives an accurate predetermination of the width of the skin portion being removed; for the width of the cut is determined by the distance between the adjacent edges of the two guide plates 35.

In operation, the knurled head 39 is turned to adjust the guide plates 35 to give the desired width of the cut; and the two nuts 28 are adjusted to move the pressure-plate 25 to give the desired depth of the cut. When so adjusted, and the motor 14 or 14a put in operation, the surgeon may move the dermatome forward, and remove a skin portion of desired width and thickness and of such length as he desires. The ribs on the pressure-plate and foot-plate are effective in preventing lateral movement of the skin under the drag imposed on it by the reciprocating knife. To make the ribs as effective as possible in attaining that end, they should have well-defined skin-engaging edges which extend as close to the cutting-edge of the knife as is permitted by the necessity for clearance and the advisability that the skin be held flat over the cutting edge.

We claim as our invention:

1. A dermatome comprising a hand-holdable frame having a foot-plate to bear against the skin, a knife mounted in said frame to oscillate transversely therein and having a cutting edge in front of and substantially in the plane of said foot-plate, a shaft rotatably mounted in said frame and having a driving connection to said knife to oscillate the latter, and a pressure-plate mounted on said frame to engage the skin in front of the knife, the skin-engaging face of said foot-plate being provided with parallel ribs transverse to the cutting edge of the knife.

2. A dermatome comprising a hand-holdable frame having a foot-plate to bear against the skin, a knife mounted in said frame to oscillate transversely therein and having a cutting edge in front of and substantially in the plane of said foot-plate, a shaft rotatably mounted in said frame and having a driving connection to said knife to oscillate the latter, and a pressure-plate mounted on said frame to engage the skin in front of the knife, the skin-engaging face of said pressure-plate being provided with parallel ribs transverse to the cutting edge of the knife.

3. A dermatome comprising a hand-holdable frame having a foot-plate to bear against the skin, a knife mounted in said frame to oscillate transversely therein and having a cutting edge in front of and substantially in the plane of said foot-plate, a shaft rotatably mounted in said frame and having a driving connection to said knife to oscillate the latter, and a pressure-plate mounted on said frame to engage the skin in front of the knife, the skin-engaging face of said pressure-plate being provided at its front portion with parallel ribs transverse to the cutting edge of the knife but having an unribbed rear portion close to the knife-edge.

4. A dermatome comprising a hand-holdable frame having a foot-plate to bear against the skin, a knife mounted in said frame to oscillate transversely therein and having a cutting edge in front of and substantially in the plane of said foot-plate, a shaft rotatably mounted in said frame and having a driving connection to said knife to oscillate the latter, and a pressure-plate mounted on said frame to engage the skin in front of the knife, the skin-engaging faces of both said foot-plate and said pressure-plate being provided with parallel ribs transverse to the cutting edge of the knife.

5. A dermatome comprising a hand-holdable frame having a foot-plate to bear against the skin, a knife mounted in said frame to oscillate transversely therein and having a cutting edge in front of and substantially in the plane of said foot-plate, a shaft rotatably mounted in said frame and having a driving connection to said knife to oscillate the latter, and a pressure-plate mounted on said frame to engage the skin in front of the knife, the skin-engaging faces of both said foot-plate and said pressure-plate being provided with parallel ribs transverse to the cutting edge of the knife, the ribs on the skin-engaging face of the pressure-plate being confined to the front portions thereof so that the rear portion thereof is unribbed.

6. A dermatome comprising a hand-holdable frame having a foot-plate to bear against the skin, a knife mounted in said frame to oscillate transversely therein and having a cutting edge in front of and substantially in the plane of said foot-plate, a shaft rotatably mounted in said frame and having a driving connection to said knife to oscillate the latter, a pressure-plate mounted on said frame to engage the skin in front of the knife and micro-adjustable relatively to the plane of the foot-plate and knife-edge, and spring-means for pressing the pressure-plate toward its support in said frame to prevent displacement due to lost motion in the adjustment.

7. A dermatome comprising a hand-holdable frame having a foot-plate to bear against the skin, a knife mounted in said frame to oscillate transversely therein and having a cutting edge in front of and substantially in the plane of said foot-plate, a shaft rotatably mounted in said frame and having a driving connection to said knife to oscillate the latter, a pressure-plate mounted on said frame to engage the skin in front of the knife, the mounting of said pressure-plate on said frame being by a screw at each end, and each screw being micro-adjustable relatively to the plane of the foot-plate and knife edge, and a compression spring surrounding each screw and pressing the screw to one end of the lost-motion its threads permit.

8. A dermatome comprising a hand-holdable frame having a foot-plate to bear against the skin, a knife mounted in said frame to oscillate transversely therein and having a cutting edge in front of and substantially in the plane of said foot-plate, a means for reciprocating said knife, a pressure-plate mounted on said frame to engage the skin in front of the knife, and two guide-plates mounted on said frame to underlie the end portions of the pressure-plate and knife-edge and adjustable relatively to each other to vary the width of the skin-surface exposed to the knife-edge.

9. A dermatome comprising a hand-holdable frame having a foot-plate to bear against the skin, a knife mounted in said frame to oscillate transversely therein and having a cutting edge in front of and substantially in the plane of said foot-plate, a shaft rotatably mounted in said frame and having a driving connection to said knife to oscillate the latter, a pressure-plate mounted on said frame to engage the skin in front of the knive, and two guide-plate mounted on said frame to underlie the end portions of the pressure-plate and knife-edge, and a right-and-left-hand screw for adjusting said guide plates toward or from the center line of the frame to vary the width of the skin-surface exposed to the knife-edge.

10. A dermatome comprising a hand-holdable frame having a foot-plate to bear against the skin, a knife mounted in said frame to oscillate transversely therein and having a cutting edge in front of and substantially in the plane of said foot-plate, a shaft rotatably mounted in said frame and having a driving connection to said knife to oscillate the latter, a pressure-plate mounted on said frame to engage the skin in front of the knife and adjustable relatively to the plane of the foot-plate and knife-edge, and two guide-plates mounted on said frame to underlie the end portions of the pressure-plate and knife-edge and adjustable relatively to each other to vary the width of the skin-surface exposed to the knife-edge.

11. A dermatome comprising a hand-holdable frame having a foot-plate to bear against the skin, a knife mounted in said frame to oscillate transversely therein and having a cutting edge in front of and substantially in the plane of said foot-plate, a shaft rotatably mounted in said frame and having a driving connection to said knife to oscillate the latter, a pressure-plate mounted on said frame to engage the skin in front of the knife and adjustable relatively to the plane of the foot-plate and knife-edge, and a right-and-left-hand screw for adjusting said guide-plates toward or from the center line of the frame to vary the width of the skin-surface exposed to the knife-edge.

12. A dermatome comprising a hand-holdable frame having a foot-plate to bear against the skin, a knife mounted in said frame to oscillate transversely therein and having a cutting edge in front of and substantially in the plane of said foot-plate, means for reciprocating said knife, and a pressure member mounted on said frame in front of the knife and adjustable relative to the plane of the foot-plate, said pressure-member and foot-plate being provided with parallel, skin engaging ribs having well defined edges extending transversely to the cutting edge of the knife.

13. A dermatome comprising a hand-holdable frame having a foot-plate to bear against the skin, a knife mounted in said frame to oscillate transversely therein and having a cutting edge in front of and substantially in the plane of said foot-plate, means for reciprocating said knife, and a pressure member mounted on said frame in front of the knife and adjustable relative to the plane of the foot-plate, said foot-plate being provided with parallel, skin engaging ribs having well defined edges extending transversely to the cutting edge of the knife.

HARRY M. BROWN.
MILFORD BARRON.

REFERENCES CITED

The following references are of record in the file of this patent:

UNITED STATES PATENTS

| Number | Name | Date |
|---|---|---|
| 1,594,613 | Hagen | Aug. 3, 1926 |
| 1,935,605 | Altruda | Nov. 21, 1933 |

Certificate of Correction

Patent No. 2,457,772.

December 28, 1948.

HARRY M. BROWN ET AL.

It is hereby certified that errors appear in the above numbered patent requiring correction as follows:

In the grant, line 3, and in the heading to the printed specification, lines 6 and 7, for the word "assignors" read *assignor*; in the grant, line 14, for "Irene Phillips Brown, her heirs" read *Milford Barron and Irene Phillips Brown, their heirs*, as shown by the record of assignments in this Office; and that the said Letters Patent should be read with these corrections therein that the same may conform to the record of the case in the Patent Office.

Signed and sealed this 3rd day of May, A. D. 1949.

[SEAL]

THOMAS F. MURPHY,
*Assistant Commissioner of Patents.*